(12) United States Patent
Patterson et al.

(10) Patent No.: US 6,549,984 B1
(45) Date of Patent: Apr. 15, 2003

(54) MULTI-BUS ACCESS CACHE

(75) Inventors: Dan W. Patterson, Sunnyvale, CA (US); Stephen H. Hunt, Felton, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/992,200

(22) Filed: Dec. 17, 1997

(51) Int. Cl.[7] .............................................. G06F 12/00
(52) U.S. Cl. ....................................... 711/122; 711/131
(58) Field of Search ................................ 711/131, 122, 711/146, 168, 150

(56) References Cited

U.S. PATENT DOCUMENTS

| | | | |
|---|---|---|---|
| 5,025,365 A | * 6/1991 | Mathur et al. | 711/121 |
| 5,228,135 A | * 7/1993 | Ikumi | 711/131 |
| 5,404,489 A | * 4/1995 | Woods et al. | 711/146 |
| 5,426,765 A | * 6/1995 | Stevens et al. | 711/131 |
| 5,564,035 A | * 10/1996 | Lai | 711/144 |
| 5,675,765 A | * 10/1997 | Malamy et al. | 711/146 |
| 5,678,020 A | * 10/1997 | Singh et al. | 711/100 |
| 5,696,935 A | * 12/1997 | Grochowski et al. | 711/146 |
| 5,768,557 A | * 6/1998 | Kulkarni | 711/146 |
| 5,802,562 A | * 9/1998 | Kahle | 711/122 |
| 5,802,574 A | * 9/1998 | Atallah et al. | 711/146 |
| 5,809,533 A | * 9/1998 | Tran et al. | 711/141 |
| 5,819,105 A | * 10/1998 | Moriarty et al. | 710/5 |

* cited by examiner

Primary Examiner—Reginald G. Bragdon
(74) Attorney, Agent, or Firm—Blakely, Sokoloff, Taylor & Zafman LLP

(57) ABSTRACT

An apparatus and method are disclosed for providing concurrent access to first storage area and a second storage area. According to one embodiment, a device includes the first storage area. The device and the second storage area are both coupled to a first bus and are coupled together by a dedicated second bus. According to one embodiment, a snoop operation on the first storage area be preferred concurrently with a snoop operation on the second storage area.

20 Claims, 4 Drawing Sheets

MULTI-BUS ACCESS CACHE

BACKGROUND OF THE INVENTION

1. Field of the Invention

The invention relates to the field of data processing. More specifically, the invention relates to improving the access of high speed data storage devices, such as cache memories, in data processing systems.

2. Background Information

A cache, which is a relatively small, yet fast storage device, is typically utilized in data processing systems to store a limited quantity of data (e.g., instructions, data operands, etc.) that has recently been used and/or is likely to be used by a processor or other device that may access the cache. As such, a cache may greatly improve the latency associated with accessing higher levels of memory (e.g., main memory, hard disk, etc.). Each item of data that is stored in a data array of the cache typically has an associated "tag" value that is stored in a tag array. In several implementations, a memory address, or a portion thereof, is typically identified by a unique tag. Thus, when a read of a memory address, for example, is requested by a device (e.g., a processor, I/O bridge, other bus master, etc.), the memory address or a portion thereof is compared against one or more tags in the tag array of the cache to determine if the data corresponding to the memory address is stored in the data array of the cache.

Data in a cache may not always be consistent with data in another storage area (e.g., main memory, higher level cache, etc.). For example, a processor may copy requested data from main memory into a cache and modify the data in the cache (or cached data). Until main memory is updated with the modified cached data, main memory will contain "stale" data that is inconsistent with the modified data in the cache. In systems where more than one device may share storage devices (e.g., multi-processing systems having caches and shared-memory), cache/data coherency becomes an important consideration, since more than one device may have access to a shared memory. Thus, various techniques have been utilized to provide coherency between various copies of data that may be present in various storage devices, including caches and other storage devices, that may be shared or accessible by a particular device or set of devices.

FIG. 1A is a block diagram illustrating an exemplary prior art computer system employing cache memories and shared-memory devices. In FIG. 1A, a system 100 is shown which includes a system bus (or "frontside bus") 110 connecting a processor 104, a memory 112, and a processor 114. The memory 112 represents a relatively slow, high level memory (e.g., main memory, hard disk, etc.) that is shared by the processor 104 and the processor 114.

The processor 104 includes an "on-chip" L1 cache 102, and is further connected, via a dedicated or "backside" bus 106, to an L2 cache 108. In one implementation, the L1 cache 102 is smaller, yet faster than the L2 cache 108. Thus, the L1 cache 102 may further cache data from the L2 cache, which in turn may cache data from the memory 112. Similarly, the processor 114 is shown having an L1 cache 120, and is further connected, via a backside bus 130, to an L2 cache 122. As shown, the L2 cache 108 includes a tag array 116 and a data array 118, and similarly, the L2 cache 122 includes a tag array 124 and a data array 126. The tag arrays 116 and 124 may store a number of tags, each corresponding to cached data stored in a location in the data arrays 118 and 126, respectively.

Upon request of data (e.g., a read request) by the processor 104, for example, the L1 cache 102 may be accessed. If an L1 cache miss occurs (i.e., the requested data is not available in the L1 cache 102), the L2 cache 108 may then be accessed via the backside bus 106 to determine if the requested data is contained therein. Additionally, data in the L1 cache 102 or the L2 cache 108 may be modified by the processor 104. In a similar manner, the processor 114 may operate in conjunction with its L1 cache 120 and L2 cache 122.

Additionally, the L1 cache 102 may monitor or "snoop" the system bus 110 to determine if data being requested or modified by a transaction on the system bus 110 (e.g., by the processor 114 or other device connected to the system bus 110) is stored in the L1 cache 102. Similarly, the L2 cache 108 may snoop, through the backside bus 106 and the processor 104, the system bus 110. For example, the processor 104 may include logic to control snoop operations by the L2 cache 108.

From the above description, it is apparent that the processor 114 or other requesting agent must monitor the system bus 110 to receive a snoop result from the L1 cache 102 and L2 cache 108 before completing a read and/or write request of the shared memory 112. However, a number of circumstances may delay the completion of a snoop operation of the L1 cache or the L2 cache 108. For example, the backside bus 106 may be occupied with a transaction between the processor 104 and the L2 cache 108, which may delay the snoop of the L2 cache 108. Furthermore, a relatively substantial delay may be incurred while awaiting snoop results of the L2 cache 108 through the processor 104 and the backside bus 106. Accordingly, the overall delay associated with obtaining snoop results first from the L1 cache and then from the L2 cache 108 through the processor 104 and backside bus 106 may be relatively substantial.

FIG. 1B is a block diagram illustrating an alternative implementation of the exemplary prior art computer system employing cache memories and shared-memory devices described with reference to FIG. 1A. In the system 150 shown in FIG. 1B, the L2 caches 108 and 122 are connected to the system bus 110, while the processors 104 and 114 are connected, via the backside bus 106 and the backside bus 130, respectively, to the L2 caches 108 and 122, respectively.

As previously described with reference to the system 100 of FIG. 1A, the backside bus 106 may be occupied with a transaction between the processor 104 and the L2 cache 108, which transaction could delay the snoop of the L1 cache 102 through the backside bus 106 and the L2 cache 108. Furthermore, L1 cache 102 is limited to perform a snoop and/or post snoop results on the system bus 110 "through" the L2 cache 108, when the L2 cache 108 is not performing the same.

Thus, it is desirable to provide cache/data coherency in a system that may include multiple caches and requesting devices, while avoiding the above-described delays associated with prior art snooping schemes.

SUMMARY OF THE INVENTION

According to one aspect of the invention, a first device is coupled to a first bus and a second bus. Additionally, a tag array is coupled to the first bus and further coupled to the first device via the second bus.

According to yet another aspect of the invention, a method is provided for allowing access by a first storage area of a first device in response to activity on a first bus. Further, in response to activity on the first bus, a method is provided for allowing access by a second storage area of the first device concurrently with the access by the first storage area, wherein the second storage area is coupled to the first bus and is further coupled to the first device via a second bus.

DETAILED DESCRIPTION

The present invention provides a method and apparatus for accessing the tag array of a backside bus via a system bus (e.g., to perform a snoop). According to one aspect of the invention, a second storage device, including snoop logic circuitry, may be coupled to a first and a second bus. The second storage device may store data for a first device coupled to the first bus. The first device may further be coupled to the second bus, and include a first storage device. According to another aspect of the invention, the first storage device may snoop the first bus in parallel with the second storage device snooping the first bus. Other features and benefits of the invention will be apparent from the following description.

In the following description, numerous specific details are set forth to provide a thorough understanding of the invention. However, it is understood that the invention may be practiced without these specific details. In other instances, well-known circuits, structures and techniques have not been shown in detail to avoid obscuring the invention.

Figure 1A:
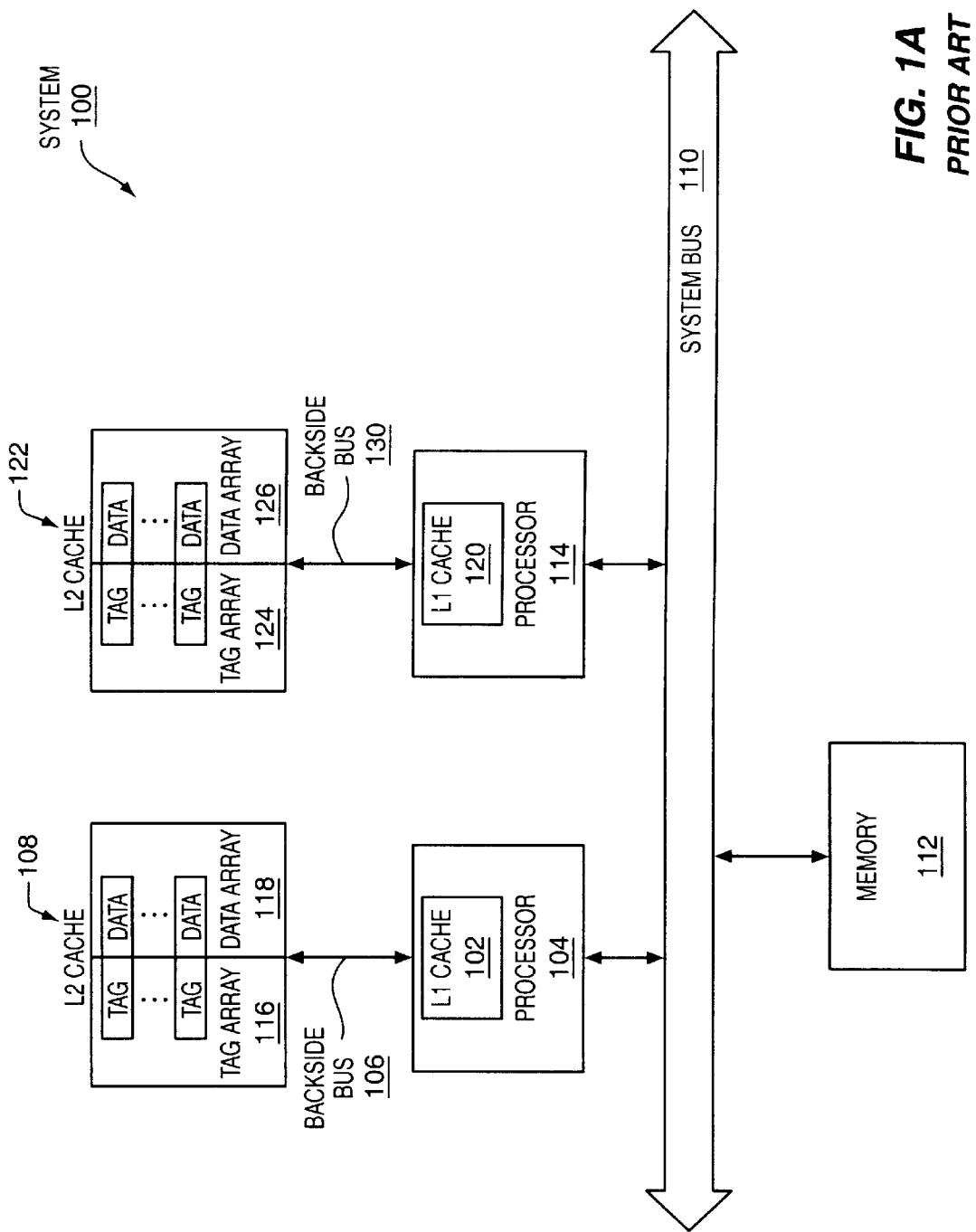
FIG. 1A is a block diagram illustrating an exemplary prior art computer system employing cache memories and shared-memory devices.
Figure 1B:
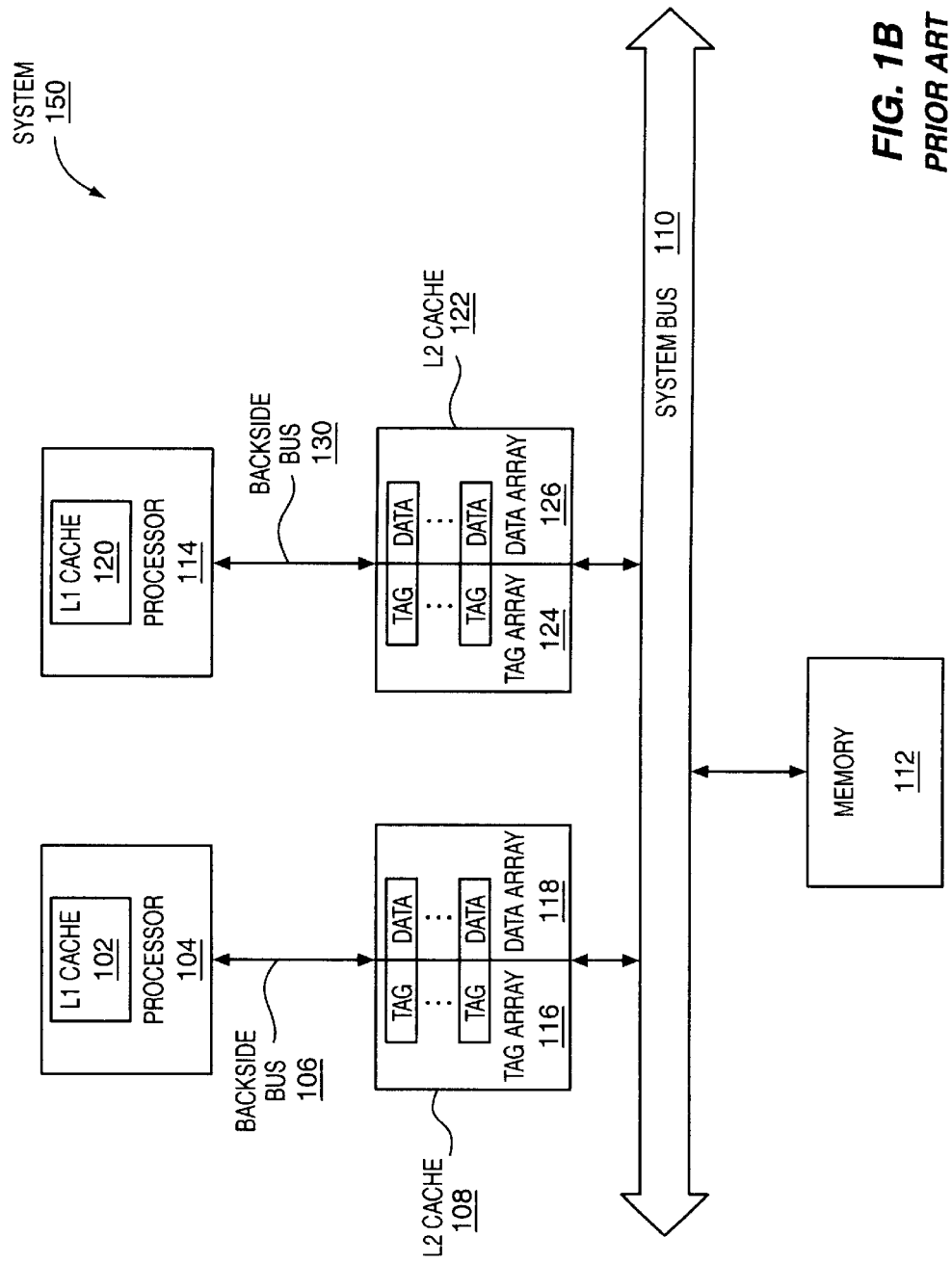
FIG. 1B is a block diagram illustrating an alternative implementation of the exemplary prior art computer system employing cache memories and shared-memory devices described with reference to FIG. 1A.
Figure 2:
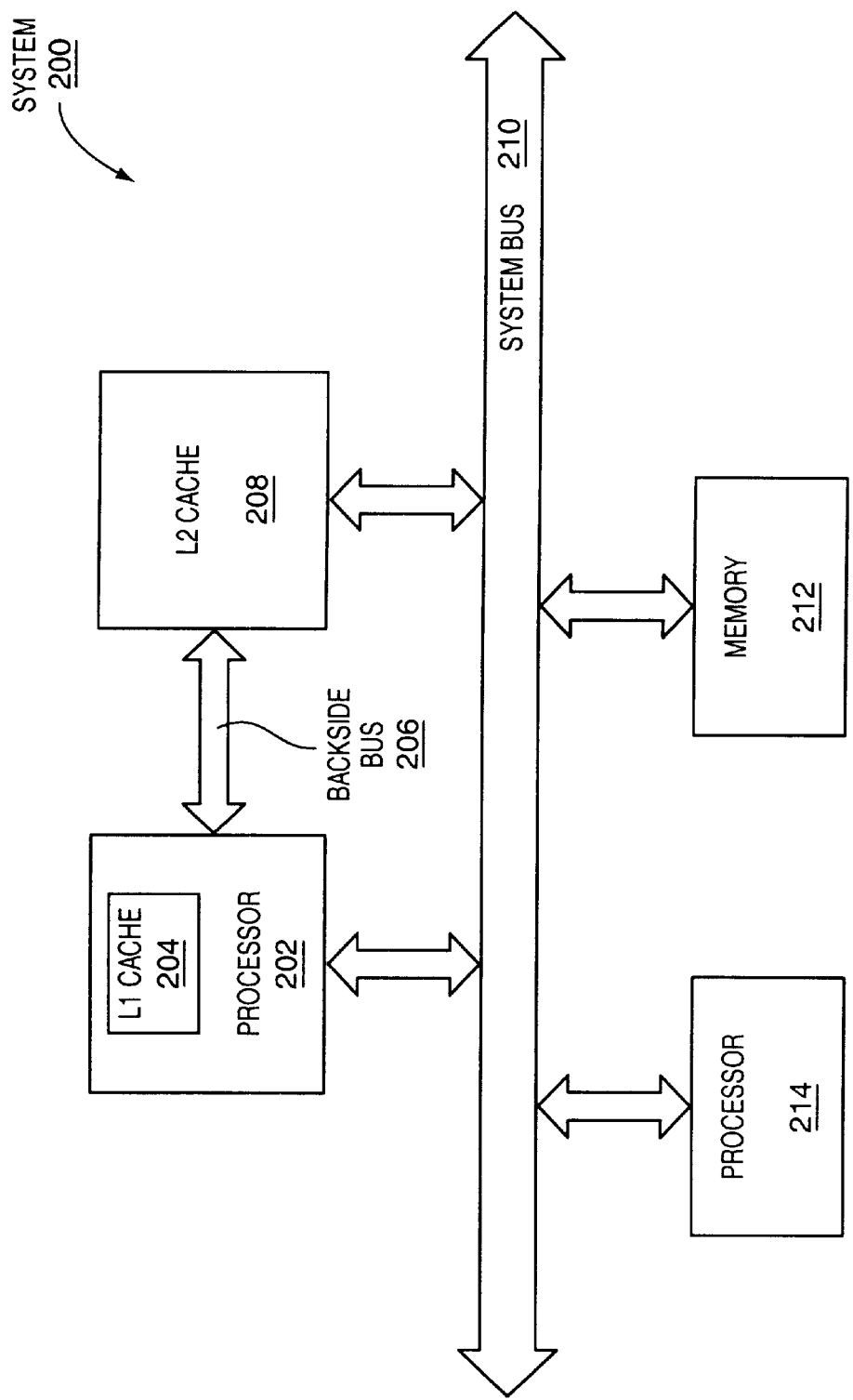
FIG. 2 is a block diagram illustrating a computer system employing a multi-bus access cache according to one embodiment of the invention.

FIG. 2 is a block diagram illustrating a computer system employing a multi-bus access cache according to one embodiment of the invention. In FIG. 2, a system 200 is shown which includes a processor 202, a memory 212, and a processor 214.

The processor 202 includes an L1 cache 204, which may be included on the same chip as the processor 202. In addition, the processor 202 is coupled, via a dedicated or "backside" bus 206, to an L2 cache 208 operable according to one embodiment of the invention. As shown, the L2 cache 208 may include a tag array and a data array, such as the tag array 304 and data array 306, described below with reference to FIG. 3. In one embodiment, the tag array may store a number of tags, each corresponding to cached data stored in a location in the data array. Additionally, the tag array and/or the data array may store information in addition to tags and cached data (e.g., one or more valid bits, cache coherency status bits, etc.).

One or both of the tag array and the data array of the L2 cache 208 may be implemented using one or more chips/memory arrays. Thus, the tag array may be incorporated as data fields within the data array, as a separate unit on the same chip as the data array, or may be implemented separately or "off-chip" relative to the data array. Furthermore, the L2 cache 208 may be implemented as a direct or n-way associatively mapped cache using various types and sizes of storage devices (e.g., DRAM, SRAM, burst SRAM, extended data out (EDO) DRAM, etc.).

As shown, the L2 cache 208 is further coupled to the system bus 210. In one embodiment of the invention, the L2 cache 208 may be coupled to the system bus 210 and the backside bus 206 using arbitration logic and/or one or more ports. Furthermore, in one embodiment of the invention, the L2 cache 208 may include bus access logic, which may provide snoop logic, as described below with reference to FIG. 3. According to one aspect of the invention, the L2 cache 208 may perform a snoop operation in response to a transaction on the system bus 210. The snoop operation of the L2 cache 208 may be performed, at least in part, in parallel with a snoop operation of the L1 cache 204 on the system bus 210.

Figure 3:
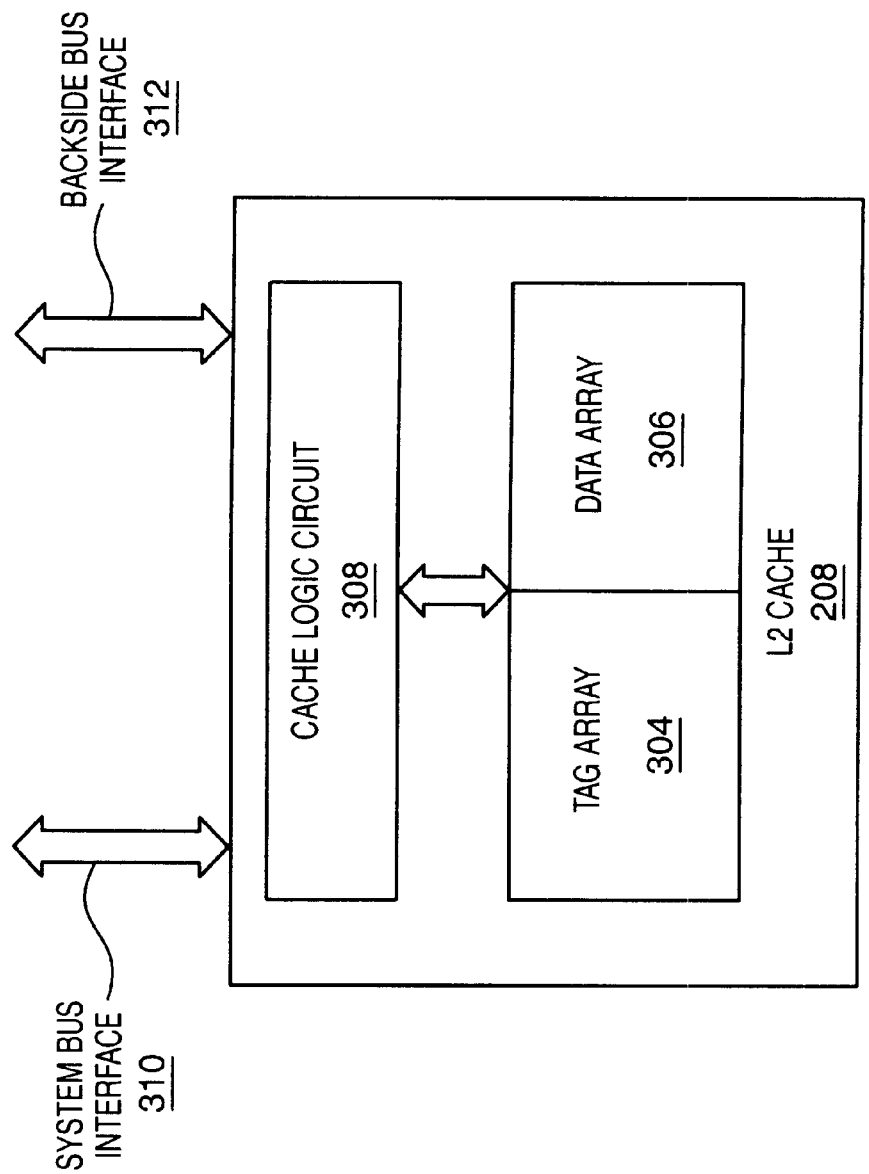
FIG. 3 is a block diagram of the L2 cache 208 of FIG. 2 according to one embodiment of the invention.

FIG. 3 is a block diagram of the L2 cache 208 of FIG. 2 according to one embodiment of the invention. While the L2 cache 208 is described to provide understanding of the invention, the invention is not limited to cache memories or L2 caches.

As shown in FIG. 3, the L2 cache 208 includes a tag array 304. The tag array 304 may store a number of values (or tags) that indicate data that may be stored in a data array 306. Although not shown, a set of one or more storage locations may also be included in the L2 cache 208 to store status bits (e.g., valid/invalid cache entry bit(s), cache coherency bit(s), etc.). The status bits may be stored as part of the tag array 304 and/or data array 306 or may be stored separately from the tag array 304 and data array 306.

The L2 cache 208 further includes a system bus interface 310, a backside bus interface 312, and a cache logic circuit 308. In one embodiment, the system bus interface 310 and backside bus interface 312 may be implemented as two ports on the cache 208. In an alternative embodiment, the system bus interface 310 and backside bus interface 312 may be implemented as one port, and the cache logic circuit 308 or other device may arbitrate access to the L2 cache 208 between the system bus and the backside bus (e.g., the access may be a read, write, snoop, etc.).

It should be appreciated that the cache logic circuit 308, tag array 304, and the data array 306, or a combination thereof, may be implemented on one, two, three, or more chips. For example, in one embodiment, the tag array 304 is implemented with a dual-ported chip to provide interfacing to two buses. The chip may include none, one, or both of the cache logic circuit 308 and the data array 306 in various embodiments of the invention.

According to one aspect of the invention, the cache logic circuit 308 may process snoop operations of the L2 cache 208 on the system bus 210. Snoop operations of the L2 cache 208 may be performed in parallel, at least in part, with snoop operations of an L1 cache or other storage devices also coupled to the system bus 210 (and/or the backside bus 206). The cache logic circuit 308 may be implemented with hardwired circuitry, instructions (e.g. microcode), or a combination thereof to respond to activity on the system bus 210 and process tag array 304 and/or L2 cache 208 activity.

According to another aspect of the invention, the L2 cache 208 may allow an access of a first type via the system bus interface 310 and an access of a second type via the backside bus interface 312. For example, while a snoop is being performed via the system bus interface 310, a processor or other device may perform another transaction with the L2 cache 208 (or one of the tag array 304 and data array 306 ) via the backside bus interface 312.

The cache logic circuit 308 may include snoop logic, arbitration logic, selection logic, buffer logic, address/control signal decode logic, etc.

In one embodiment, the L2 cache 208 operates in accordance with the bus signals of an Intel Pentium® processor. To illustrate some of the signals/pins, reference is made to TABLE 1 below. A more detailed description of such signals may be found in "Pentium® Processor's User's Manual, Volume 1: Pentium Processor Data Book," available from Intel Corporation, Santa Clara, Calif. However, it should be understood that the invention is not limited to a particular type/configuration of processor, bus, signals, etc.

TABLE 1

| Signal Name | Description |
| --- | --- |
| A31-A3 | Address Bus. In one embodiment of the invention, the address bus provides input to the L2 cache 208, and is utilized to snoop the system bus 210. In one embodiment, to maintain cache coherency, the L2 cache 208 transfers modified data to the system bus 210 by first transferring the modified data to the processor 202 via the backside bus 206; subsequently, the processor 202 transfers the modified data to the system bus 210. In alternative embodiments, the address bus may be greater or less than 29 bits. |
| AP | Address Parity. In one embodiment of the invention, the AP pin would allow input to the L2 cache 208 for parity coverage of the address bus during snoop cycles (sometimes referred to as inquiry cycles). |
| APCHK# | Address Parity Check. In one embodiment of the invention, the APCHK# pin allows output from the L2 cache 208 to indicate whether an address parity error is detected when the address bus is driven during a snoop cycle. In one embodiment, the processor 202 may also include an equivalent cooperating pin, in which embodiment the two pins are of a "wired-AND" type configuration. |
| HLDA | Hold Acknowledge. In one embodiment of the invention, the HLDA pin provides input to the L2 cache 208 to indicate that its associated processor 202 has relinquished ownership of the system bus 210, and a snoop cycle or other type of bus access operation/transaction may be performed by the L2 cache 208. |
| AHOLD | Address Hold Request. In one embodiment, the AHOLD pin provides input to the L2 cache 208 to indicate that its associated processor 202 has relinquished ownership of the address portion (e.g., A31-A3) of the system bus 210, and a snoop cycle or other type of bus access operation/transaction may be performed by the L2 cache 208. |
| BOFF# | Backoff. In one embodiment of the invention, the BOFF# pin provides input to the L2 cache 208 to indicate that its associated processor 202 has relinquished ownership of the system bus 210, and a snoop cycle or other type of bus access operation/transaction may be performed by the L2 cache 208. |
| EADS# | External Address Strobe. In one embodiment of the invention, the EADS# pin provides input to the L2 cache 208 to request a snoop cycle from the L2 cache 208. In response to an assertion of the input EADS# signal, the L2 cache 208 may access its tag array to determine the presence/absence of the tag portion of an address driven on the address bus. The result of such a tag lookup may be output on a set of pins (e.g., the HIT# and HITM# output pins described below). |
| HIT# | Hit. In one embodiment of the invention, the HIT# pin provides output from the L2 cache 208 to indicate whether a snoop cycle resulted in a hit to a valid line in the L2 cache 208. In one embodiment, the processor 202 may also include an equivalent cooperating pin, in which embodiment the two pins are of a "wired-AND" type configuration. |
| HITM# | Hit Modified. In one embodiment of the invention, the HITM# pin provides output from the L2 cache 208 to indicate whether a snoop cycle resulted in a hit to a modified line in the L2 cache 208. In one embodiment, the L2 cache 208 transfers modified data to the system bus 210 by first transferring the modified data to the processor 202 via the backside bus 206; subsequently, the processor 202 transfers the modified data to the system bus 210. In one embodiment, the processor 202 may also include an equivalent cooperating pin, in which embodiment the two pins are of a "wired-AND" type configuration. |

It should be appreciated that the invention is not limited to cache memories, L1 caches, L2 caches, a system bus, a backside bus, etc. As such, the invention could be embodied in various types of storage devices (e.g., one or more cache memories, a translation lookaside buffer, etc.) coupled to various types and numbers of bus (e.g., a system bus, a backside bus, a host bus, etc.) and/or devices (e.g., I/O controllers, bridges, processors, etc.).

In one embodiment, the invention is provided in a tag array of a cache. The tag array may be coupled to a first and a second bus (e.g., via two ports, one port controlled by arbitration logic, etc.). The tag array may provide snooping via the first bus, in parallel with another storage device (e.g., a cache) also coupled to the first bus. The second storage device may also be coupled to the second bus. The tag array and data array may be integrated as one or more units on a single chip or multiple chips with or without bus/snoop logic circuitry. Furthermore, the cache may be implemented using one or more types and sizes of memory devices, such as static random access memory (SRAM) arrays or other types of non-volatile memories. In one embodiment, the SRAM data array provides burst data transfer, and thus, is implemented as a BSRAM.

ALTERNATIVE EMBODIMENTS

While the invention has been described in terms of several embodiments, those skilled in the art will recognize that the invention is not limited to the embodiments described. Therefore, it should be understood that the method and apparatus of the invention can be practiced with modification and alteration within the spirit and scope of the appended claims. The description is thus to be regarded as illustrative instead of limiting on the invention.

What is claimed is:

1. A computer system comprising:
   a processor, the processor including a first cache memory, the first cache memory being a first level cache for the processor;
   a second cache memory outside the processor, the second cache memory being a second level cache for the processor;
   a dedicated backside bus, the dedicated backside bus coupling the processor to the second cache memory, the dedicated backside bus being dedicated to the transfer of data between the processor and the second cache memory; and
   a system bus, the second cache memory being operable to perform a snoop operation on the system bus concurrently at least in part with a transaction between the processor and the second cache memory using the dedicated backside bus, the transaction comprising the transfer of modified data from the second cache memory to the processor.

2. The computer system of claim 1, wherein the second cache memory comprises:
   a first port coupled to the system bus; and
   a second port coupled to the backside bus.

3. The computer system of claim 1, wherein the second cache memory comprises:
   a logic circuit; and
   a tag array, coupled to the logic circuit, to exchange a set of signals to perform a snoop operation.

4. A method comprising:
   detecting activity on a system bus on which a processor and a second memory cache to the processor reside, the processor including a first memory cache, the first memory cache being a first level cache for the processor and the second memory cache being a second level cache for the processor, the processor and the second memory cache being coupled together by a dedicated backside bus;

in response to the activity on the system bus, the first memory cache performing a snoop operation on the first bus concurrently at least in part with a transaction between the processor and the second memory cache using the dedicated backside bus, the transaction comprising the transfer of modified data from the second cache memory to the processor.

5. The method of claim 4, wherein the second cache memory comprises:
    a first port coupled to the system bus; and
    a second port coupled to the backside bus.

6. The method of claim 4, wherein the second cache memory comprises:
    a logic circuit; and
    a tag array, coupled to the logic circuit, to exchange a set of signals to perform a snoop operation.

7. A cache memory comprising:
    a data array to store cached data from a higher level storage device;
    a tag array associated with the data array to store a unique tag for each item of data stored in the data array to allow a determination to be made regarding whether data associated with a particular memory address is currently stored in the data array;
    a backside bus interface coupled with a backside bus of a computer system to provide a dedicated communication interface between a processor of the computer system and the cache memory;
    a system bus interface coupled with a system bus of the computer system to which the processor is also coupled; and
    a bus logic circuit coupled to the system bus interface and the backside bus interface to arbitrate access to the tag array and the data array by the system bus interface and the backside bus interface and capable of performing a snoop operation on the system bus in response to a transaction on the system bus in parallel at least in part with a transaction on the backside bus, the transaction on the backside bus comprising the transfer of modified data from the cache memory to the processor.

8. The apparatus of claim 1, wherein the first and second storage areas are cache memories.

9. The apparatus of claim 1, wherein the access of the first and second storage areas comprises a snoop operation.

10. The cache memory of claim 7, wherein the cache memory is an L2 cache memory for a microprocessor.

11. A computer system comprising:
    a processor, the processor including a first cache memory, the first cache memory being a first level cache for the processor;
    a second cache memory outside the processor, the second cache memory being a second level cache for the processor;
    a dedicated backside bus, the dedicated backside bus coupling the processor to the second cache memory, the dedicated backside bus being dedicated to the transfer of data between the processor and the second cache memory; and
    a system bus, the second cache memory being operable to perform a snoop operation on the system bus concurrently with a transaction between the processor and the second cache memory using the dedicated backside bus, the transaction comprising the transfer of modified data from the second cache memory to the processor.

12. The method of claim 10, wherein the first device comprises a processor.

13. The computer system of claim 11, wherein the second cache memory comprises:
    a logic circuit; and
    a tag array, coupled to the logic circuit, to exchange a set of signals to perform a snoop operation.

14. A method comprising:
    detecting activity on a system bus on which a processor and a second memory cache to the processor reside, the processor including a first memory cache, the first memory cache being a first level cache for the processor and the second memory cache being a second level cache for the processor, the processor and the second memory cache being coupled together by a dedicated backside bus;
    in response to the activity on the system bus, the first memory cache performing a snoop operation on the first bus concurrently with a transaction between the processor and the second memory cache using the dedicated backside bus, the transaction comprising the transfer of modified data from the second cache memory to the processor.

15. The method of claim 14, wherein the second cache memory comprises:
    a first port coupled to the system bus; and
    a second port coupled to the backside bus.

16. The method of claim 14, wherein the second cache memory comprises:
    a logic circuit; and
    a tag array, coupled to the logic circuit, to exchange a set of signals to perform a snoop operation.

17. A cache memory comprising:
    a data array to store cached data from a higher level storage device;
    a tag array associated with the data array to store a unique tag for each item of data stored in the data array to allow a determination to be made regarding whether data associated with a particular memory address is currently stored in the data array;
    a backside bus interface coupled with a backside bus of a computer system to provide a dedicated communication interface between a processor of the computer system and the cache memory;
    a system bus interface coupled with a system bus of the computer system to which the processor is also coupled; and
    a bus logic circuit coupled to the system bus interface and the backside bus interface to arbitrate access to the tag array and the data array by the system bus interface and the backside bus interface and capable of performing a snoop operation on the system bus in response to a transaction on the system bus in parallel with a transaction on the backside bus, the transaction on the backside bus comprising the transfer of modified data from the cache memory to the processor.

18. The cache memory of claim 17, wherein the system bus interface and the backside bus interface are implemented as two separate ports.

19. The cache memory of claim 17, wherein the tag array comprises a dual-ported memory to allow concurrent access by the system bus interface and the backside bus interface.

20. The cache memory of claim 17, wherein the cache memory is an L2 cache memory for a microprocessor.

* * * * *

UNITED STATES PATENT AND TRADEMARK OFFICE
CERTIFICATE OF CORRECTION

PATENT NO. : 6,549,984 B1  Page 1 of 1
DATED : April 15, 2003
INVENTOR(S) : Patterson et al.

It is certified that error appears in the above-identified patent and that said Letters Patent is hereby corrected as shown below:

Column 7,
Lines 42 and 45, delete "8. The apparatus of claim 1, wherein the first and second storage areas are cache memories.
9. The apparatus of claim 1, wherein the access of the first and second storage areas comprises a snoop operation.", insert: 8. The cache memory of claim 7, wherein the system bus interface and the backside bus interface are implemented as two separate ports.
9. The cache memory of claim 7, wherein the tag array comprises a dual-ported memory to allow concurrent access by the system bus interface and the backside bus interface. --
Lines 66 and 67, delete "12. The method of claim 10, wherein the first device comprises a processor." and insert: 12. The computer system of claim 11, wherein the second cache memory comprises:
a first port coupled to the system bus; and
a second port coupled to the backside bus. --.

Signed and Sealed this

Twelfth Day of August, 2003

JAMES E. ROGAN
*Director of the United States Patent and Trademark Office*